(12) United States Patent
Yun

(10) Patent No.: US 11,466,494 B2
(45) Date of Patent: Oct. 11, 2022

(54) STRUCTURE FOR PREVENTING SLIDING DOOR FROM SWAYING

(71) Applicants: Hyundai Motor Company, Seoul (KR); Kia Motors Corporation, Seoul (KR)

(72) Inventor: Hyung-In Yun, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/169,944

(22) Filed: Feb. 8, 2021

(65) Prior Publication Data
US 2022/0120126 A1    Apr. 21, 2022

(30) Foreign Application Priority Data
Oct. 15, 2020    (KR) .................. 10-2020-0133516

(51) Int. Cl.
| | | |
|---|---|---|
| E05F 11/00 | (2006.01) | |
| E05D 15/06 | (2006.01) | |
| E05F 15/646 | (2015.01) | |
| E05F 15/652 | (2015.01) | |
| B60J 5/06 | (2006.01) | |

(52) U.S. Cl.
CPC ........... *E05D 15/0604* (2013.01); *B60J 5/06* (2013.01); *E05D 15/0682* (2013.01); *E05D 15/0686* (2013.01); *E05F 15/646* (2015.01); *E05F 15/652* (2015.01); *E05Y 2201/434* (2013.01); *E05Y 2201/64* (2013.01); *E05Y 2201/654* (2013.01); *E05Y 2201/684* (2013.01); *E05Y 2201/702* (2013.01); *E05Y 2900/531* (2013.01)

(58) Field of Classification Search
CPC ........... E05D 15/0604; E05D 15/0682; E05D 15/0686; B60J 5/06; E05F 15/646; E05F 15/652; E05Y 2201/434; E05Y 2201/64; E05Y 2201/654; E05Y 2201/684; E05Y 2201/702; E05Y 2900/531
USPC .......................................................... 49/360
See application file for complete search history.

(56) References Cited

U.S. PATENT DOCUMENTS

| | | | | |
|---|---|---|---|---|
| 2016/0356069 | A1* | 12/2016 | Choi | ................... F16H 19/06 |
| 2021/0172238 | A1* | 6/2021 | Yun | ................... E05D 15/1042 |
| 2021/0355728 | A1* | 11/2021 | Kim | ................... G06N 20/00 |

FOREIGN PATENT DOCUMENTS

| | | | | |
|---|---|---|---|---|
| EP | 3643866 A1 * | 4/2020 | ............ | B60J 5/0468 |
| KR | 101684536 B1 | 12/2016 | | |
| WO | WO-2020109535 A1 * | 6/2020 | ............... | B60J 5/06 |

\* cited by examiner

*Primary Examiner* — Jerry E Redman
(74) *Attorney, Agent, or Firm* — Slater Matsil, LLP

(57) ABSTRACT

A structure for preventing a sliding door from swaying includes a rail mounted in a first direction that is a longitudinal direction of a vehicle body, a rail roller unit rollably connected to the rail, a sliding module configured to apply driving power in the first direction to the rail roller unit through a cable, a slider mounted on the rail roller unit, a movement support unit configured to support the sliding door, wherein a first side of the movement support unit is fixed to the sliding door, and a second side of the movement support unit is rollably connected to the slider, and a spindle assembly configured to operate a spindle between the sliding door and the rail to move the sliding door in a second direction perpendicular to the first direction.

20 Claims, 10 Drawing Sheets ize: medium;"># STRUCTURE FOR PREVENTING SLIDING DOOR FROM SWAYING

CROSS-REFERENCE TO RELATED APPLICATIONS

This application claims priority to Korean Patent Application No. 10-2020-0133516, filed in the Korean Intellectual Property Office on Oct. 15, 2020, which application is hereby incorporated herein by reference.

TECHNICAL FIELD

The present invention relates to a structure for preventing a sliding door from swaying.

BACKGROUND

In general, a vehicle has an occupant compartment having a predetermined size in which a driver or an accompanied occupant may be seated, and occupant compartment opening/closing doors are installed on a vehicle body to open or close the occupant compartment.

Sliding type occupant compartment opening/closing doors include a front sliding door installed at a front side in a longitudinal direction of a vehicle and a rear sliding door installed at a rear side in the longitudinal direction of the vehicle. The front sliding door and the rear sliding door are typically installed to be moved along rails mounted on a vehicle body or the doors.

However, the sliding type occupant compartment opening/closing door in the related art requires three rails (an upper rail, a center rail, and a lower rail) that support an upper portion, a middle portion, and a lower portion of the door, respectively, during the process of opening or closing the door, and the sliding type occupant compartment opening/closing door also requires components related to the rails. For this reason, the sliding type occupant compartment opening/closing door in the related art has a problem in that the weight of the vehicle and the number of components are increased and a degree of design freedom of the vehicle deteriorates.

Therefore, there has been developed a two-rail type door system for a vehicle in which a sliding door is slidably supported only with center and lower rails. For example, Korean Patent No. 10-1684536 and U.S. counterpart publication 2016/356069 (Sliding Door System for Vehicle) in the related art discloses that a door rail (i.e., a center rail) is mounted on a sliding door, a vehicle body rail (i.e., a lower rail) is mounted on a vehicle body, and the sliding door is opened or closed as a center slider coupled to the door rail and a lower slider coupled to the vehicle body rail are moved.

However, referring to FIG. 1, in the sliding structure in the related art, as support points at which the sliding door is supported, two support points including a contact point A between the vehicle body rail and the lower slider and a contact point B between the center rail and the center slider are formed in a vertical direction. However, there is a problem in that the sliding door rotates about an imaginary axis X connecting the contact points. In addition, because the support points for the sliding door are formed only on the imaginary axis X, there remains only one contact point A in a load direction (direction of the imaginary axis X) when a load of the sliding door is applied, and as a result, there is a problem in that the sliding door cannot be stably supported, and the sliding door sways while moving.

SUMMARY

The present invention relates to a structure for preventing a sliding door from swaying. Particular embodiments relate to a structure for preventing a sliding door from swaying, the structure being capable of preventing sway of the sliding door in a vehicle mounted with the sliding door and having only lower rails.

Embodiment of the present invention provide a new type of structure capable of preventing sway of a sliding door and supporting a load while the sliding door is opened or closed in a vehicle mounted with the sliding door and having only lower rails.

An exemplary embodiment of the present invention provides a structure for preventing a sliding door from swaying, the structure including a rail mounted in a longitudinal direction of a vehicle body, a rail roller unit rollably connected to the rail, a sliding module configured to apply driving power in a first direction to the rail roller unit through a cable, a slider mounted on the rail roller unit in a longitudinal direction, a movement support unit fixed, at one side thereof, to a door, rollably connected, at the other side thereof, to the slider, and configured to support the door, and a spindle assembly configured to operate a spindle between the door and the rail to move the door in a second direction.

According to embodiments of the present invention, the following effects are achieved.

First, rotation factors required to rotate a door in a vehicle mounted with sliding doors in the related art are removed, and as a result, it is possible to minimize the sway of the door when the door operates.

Second, an upper part and a center part configured to move a door in a vehicle mounted with sliding doors in the related art are removed, and as a result, it is possible to improve a degree of design freedom of a vehicle and ensure an interior package space.

Third, the movement support unit and the rail roller unit may prevent the sway of the door while supporting the door when the door operates.

Fourth, in order to prevent the sway of the door, the movement of the door in any one of the first and second directions is controlled and restricted while the door moves in the other direction.

DETAILED DESCRIPTION OF ILLUSTRATIVE EMBODIMENTS

Hereinafter, exemplary embodiments of a structure for preventing a sliding door from swaying will be described in detail with reference to the drawings. Terms or words used herein should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Figure 1:
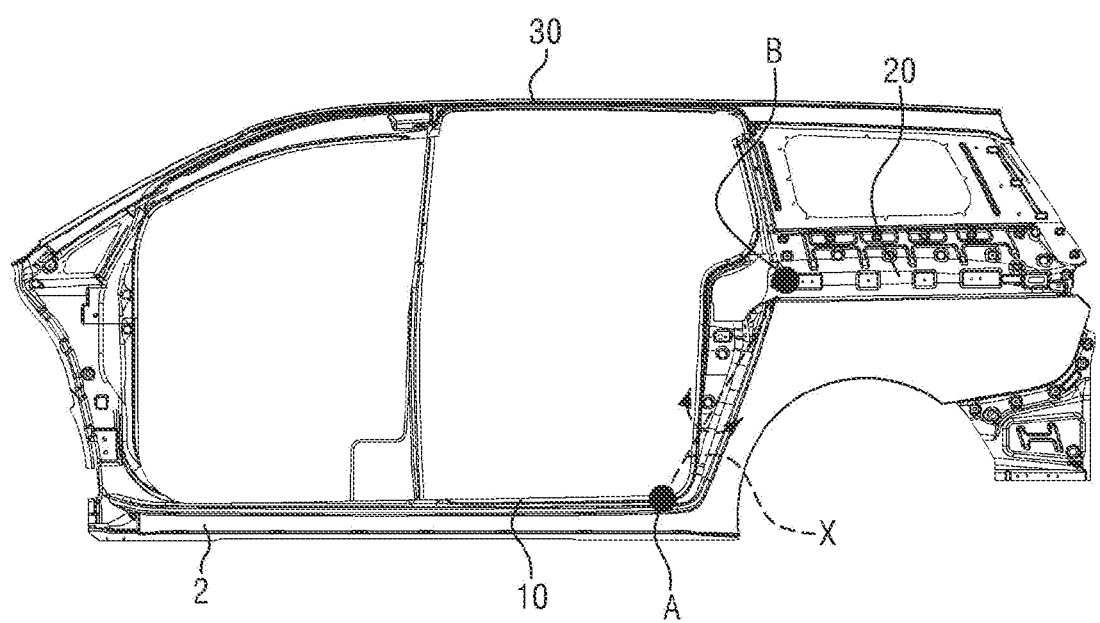
FIG. 1 is a view illustrating support points at which a sliding door for a vehicle having only center and lower rails in the related art is supported.

According to an exemplary embodiment of the present invention, a vehicle has only a lower rail 100 (a rail provided at a lower side of the vehicle), but has neither center rail 20 (a rail provided at a center of the vehicle illustrated in FIG. 1) nor upper rail 30 (a rail provided at an upper side of the vehicle illustrated in FIG. 1).

The sliding doors 1 include a front door and a rear door, and the structure for preventing a sliding door from swaying according to an exemplary embodiment of the present invention is applied to the lower rail 100 of the front door or the rear door. Therefore, the structures for preventing a sliding door from swaying, which are applied to the front door and the rear door, respectively, are identical in configuration and operational principle. However, in the present specification, an example in which the structure for preventing a sliding door from swaying is applied to any one of the sliding doors 1 will be described.

Figure 2:
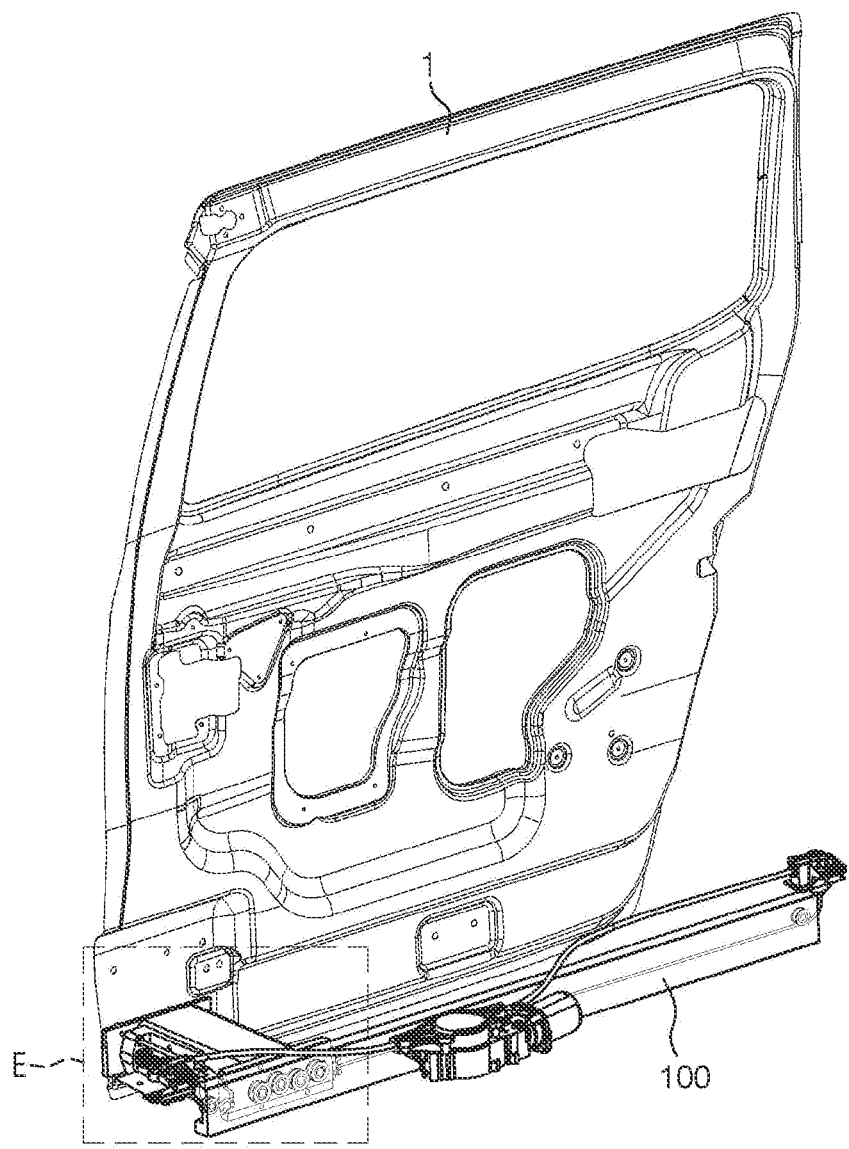
FIG. 2 is a view illustrating a state in which a structure for preventing a sliding door from swaying according to an exemplary embodiment of the present invention is applied to a door.
Figure 3:
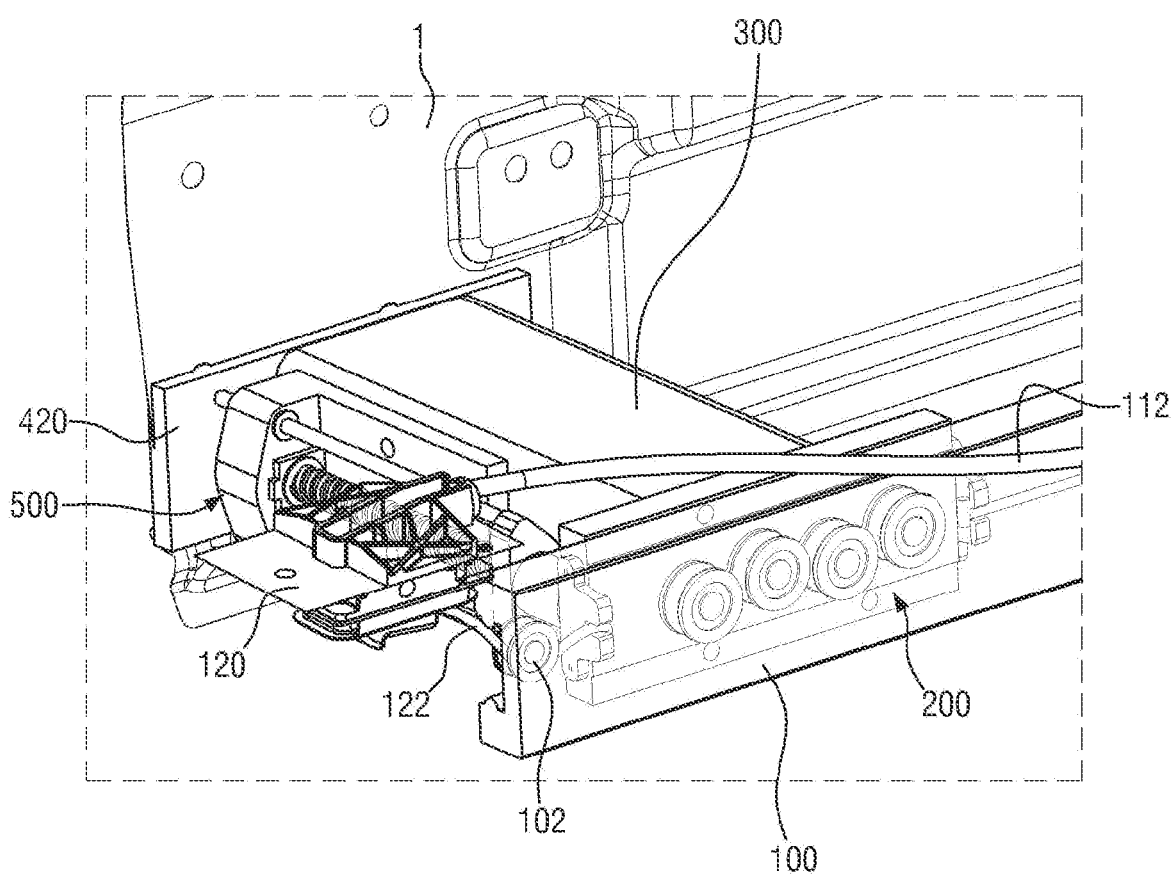
FIG. 3 is an enlarged view of part E in FIG. 2.

FIG. 2 is a view illustrating a state in which the structure for preventing a sliding door from swaying according to an exemplary embodiment of the present invention is applied to a door, and FIG. 3 is an enlarged view of part E in FIG. 2.

Referring to FIGS. 2 and 3, the structure for preventing a sliding door from swaying according to an exemplary embodiment of the present invention is provided at lower sides of a vehicle body 2 and the door 1 and includes the lower rail 100, a rail roller unit 200, a slider 300, a movement support unit 400 (see FIG. 8), and a spindle assembly 500.

In this case, the rail roller unit 200 moves in a longitudinal direction (T direction) of the vehicle body 2, and the T direction is defined as a first direction in the present specification. Further, the movement support unit 400 moves in a width direction (L direction) of the vehicle body 2, and the L direction is defined as a second direction in the present specification.

Figure 4:
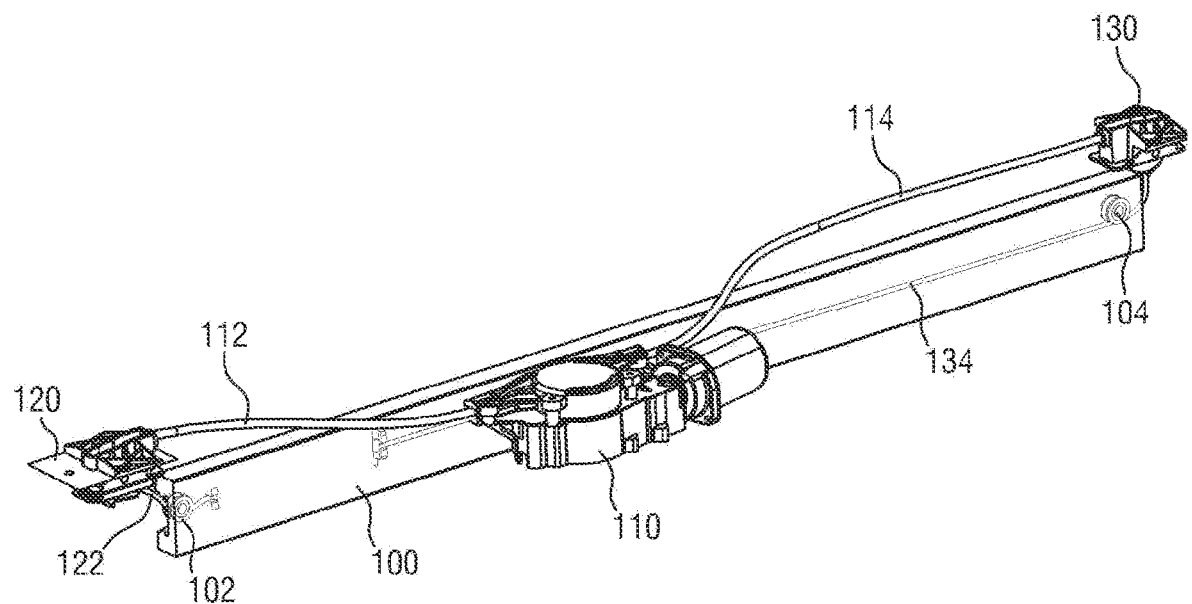
FIG. 4 is a view illustrating a state in which a sliding module according to an exemplary embodiment of the present invention is connected to a lower rail.

FIG. 4 is a view illustrating a state in which a sliding module according to an exemplary embodiment of the present invention is connected to a lower rail. Meanwhile, for convenience of description, the rail roller unit 200 is omitted from FIG. 4.

Referring to FIG. 4, the lower rail 100 is elongated in the longitudinal direction of the vehicle body 2 and mounted on the vehicle body 2. In an exemplary embodiment of the present invention, the lower rail 100 is a rectilinear rail.

A roller groove (reference numeral thereof is not illustrated) is formed in one surface (a surface facing the door 1) of the lower rail 100. A driving-sliding module 110 is positioned in the vicinity of the other surface (a surface facing the vehicle body 2) of the lower rail 100, and first and second sliding modules 120 and 130 are positioned in the vicinity of both sides in a longitudinal direction of the lower rail 100 (a completely closed position or a completely opened position of the door 1).

The driving-sliding module no provides driving power to the rail roller unit 200 so that the rail roller unit 200 may move in the longitudinal direction (first direction) along the lower rail 100. The driving-sliding module 110 includes a motor that may rotate in a forward or reverse direction. The driving-sliding module 110 and the first sliding module 120 are connected with a first-1 cable 112, and the driving-sliding module 110 and the second sliding module 130 are connected with a second-1 cable 114. The first sliding module 120 changes a direction of the first-1 cable 112 and guides the first-1 cable 112 to one side of the lower rail 100, thereby defining a first-2 cable 122. The first-2 cable 122 is switched to the first direction by being guided by a first pulley 102 mounted at one side of the lower rail 100 and then connected to the rail roller unit 200. The second sliding module 130 changes a direction of the second-1 cable 114 and guides the second-1 cable 114 to the other side of the lower rail 100, thereby defining a second-2 cable 134. The second-2 cable 134 is switched to the first direction by being guided by a second pulley 104 mounted at the other side of the lower rail 100 and then connected to the rail roller unit 200.

When the motor of the driving-sliding module 110 rotates in one direction, the first-1 cable 112 and the first-2 cable 122 are pulled toward the driving-sliding module 110, such that the rail roller unit 200 moves in any one direction of the first direction, for example, in a left direction based on FIG. 4. On the contrary, when the motor of the driving-sliding module 110 rotates in the other direction, the second-1 cable 114 and the second-2 cable 134 are pulled toward the driving-sliding module 110, such that the rail roller unit 200 moves in the other direction of the first direction, for example, in a right direction based on FIG. 4. Therefore, the rail roller unit 200 may be moved in the first direction by the driving power of the driving-sliding module 110.

Figure 5:
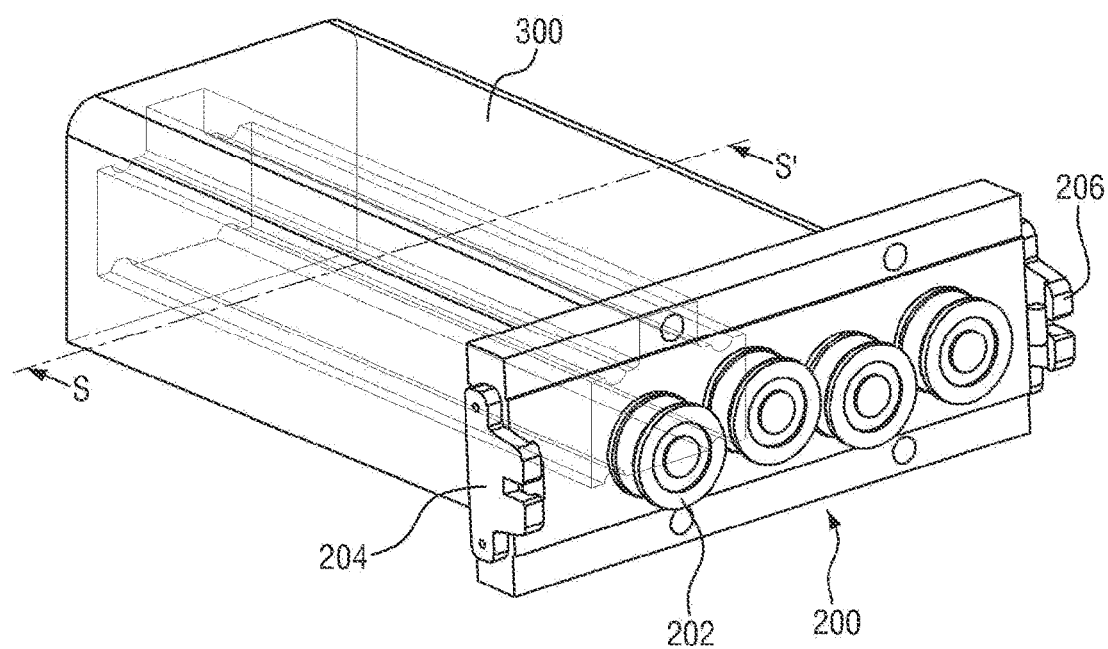
FIG. 5 is a view illustrating a state in which a slider and a rail roller unit according to an exemplary embodiment of the present invention are coupled.
Figure 6:
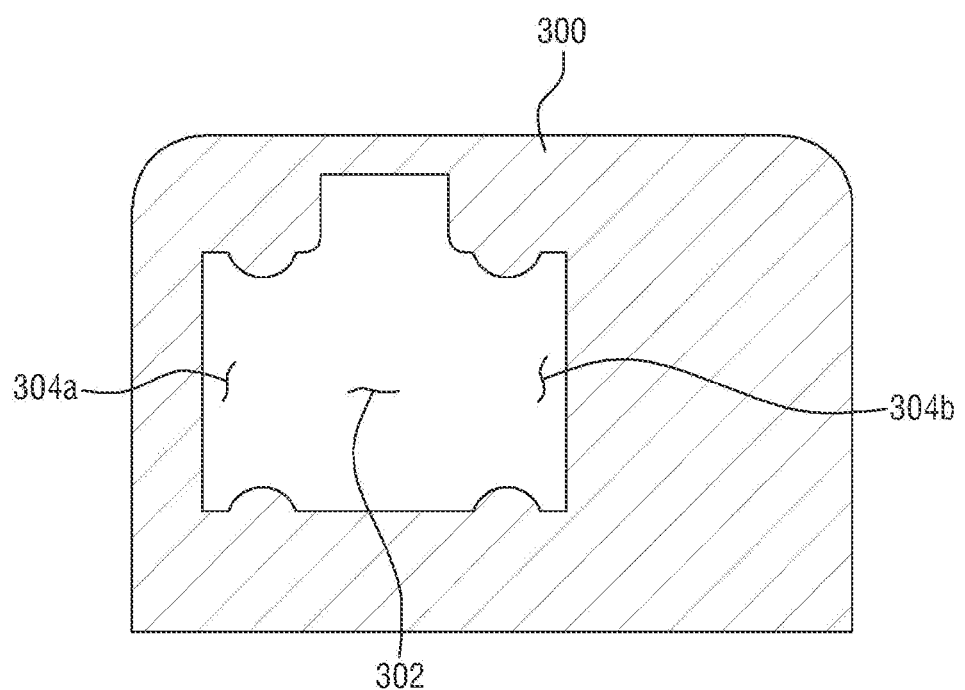
FIG. 6 is a view illustrating a cross section taken along line S-S' in FIG. 5.
Figure 7:
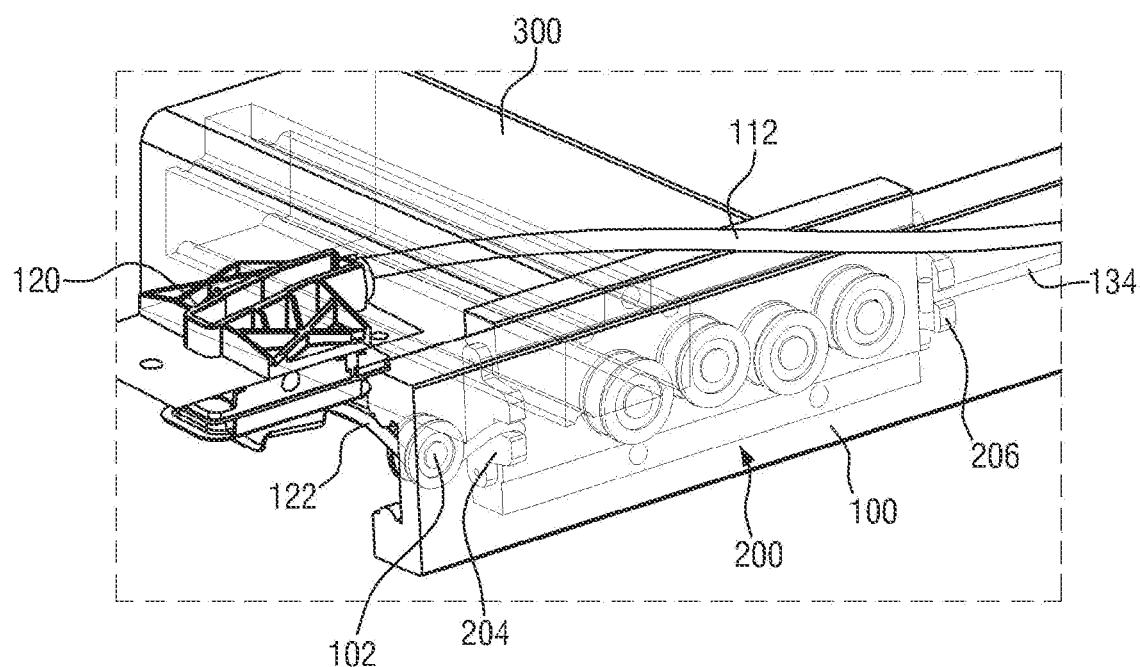
FIG. 7 is a view illustrating a state in which the rail roller unit according to an exemplary embodiment of the present invention is connected to the lower rail.

FIG. 5 is a view illustrating a state in which the slider and the rail roller unit according to an exemplary embodiment of the present invention are coupled, FIG. 6 is a view illustrating a cross section taken along line S-S' in FIG. 5, and FIG. 7 is a view illustrating a state in which the rail roller unit according to an exemplary embodiment of the present invention is connected to the lower rail.

Referring to FIGS. 3, 5, and 7, the rail roller unit 200 is rollably connected to the lower rail 100. First rollers 202 are provided on one surface of the rail roller unit 200 so as to be inserted into the roller groove (reference numeral thereof is not illustrated) of the lower rail 100. When the first rollers 202 are inserted into the roller groove, the rail roller unit 200 may roll in the first direction along the lower rail 100. In this case, the first roller 202 functions as a bearing.

Cable holders 204 and 206 are provided at both sides of the rail roller unit 200. One end of the first-2 cable 122 is connected to the first cable holder 204, and one end of the second-2 cable 134 is connected to the second cable holder 206.

The slider 300 is fixedly mounted, at one side in a longitudinal direction thereof, on the rail roller unit 200. The slider 300 has a predetermined length and a predetermined width. In this case, the predetermined length refers to a length when the slider does not interfere with the door 1 in a state in which the door 1 is completely closed. The predetermined width refers to a width when the slider may support the door 1. The length and the width of the slider 300 may be set without limitation.

An internal space is elongated in a longitudinal direction thereof in the slider 300, and a movement support unit 400 to be described below may be inserted into the internal space. The internal space may be referred to as a movement route along which the movement support unit 400 may roll. There is no limitation to a position of the internal space formed in the slider 300. In addition, a region of the slider 300, except for the internal space, may have a structure and a material that may maintain rigidity of the slider 300.

Referring to FIG. 6, the internal space has roller movement paths 304a and 304b in which second rollers 412 to be described below may move, and a support member movement path 302 in which a support member 410 may move. FIG. 6 illustrates that the roller movement paths 304a and 304b are formed at both sides of the support member movement path 302, but the shape of the internal space may vary depending on the shape of the movement support unit 400.

Figure 8:
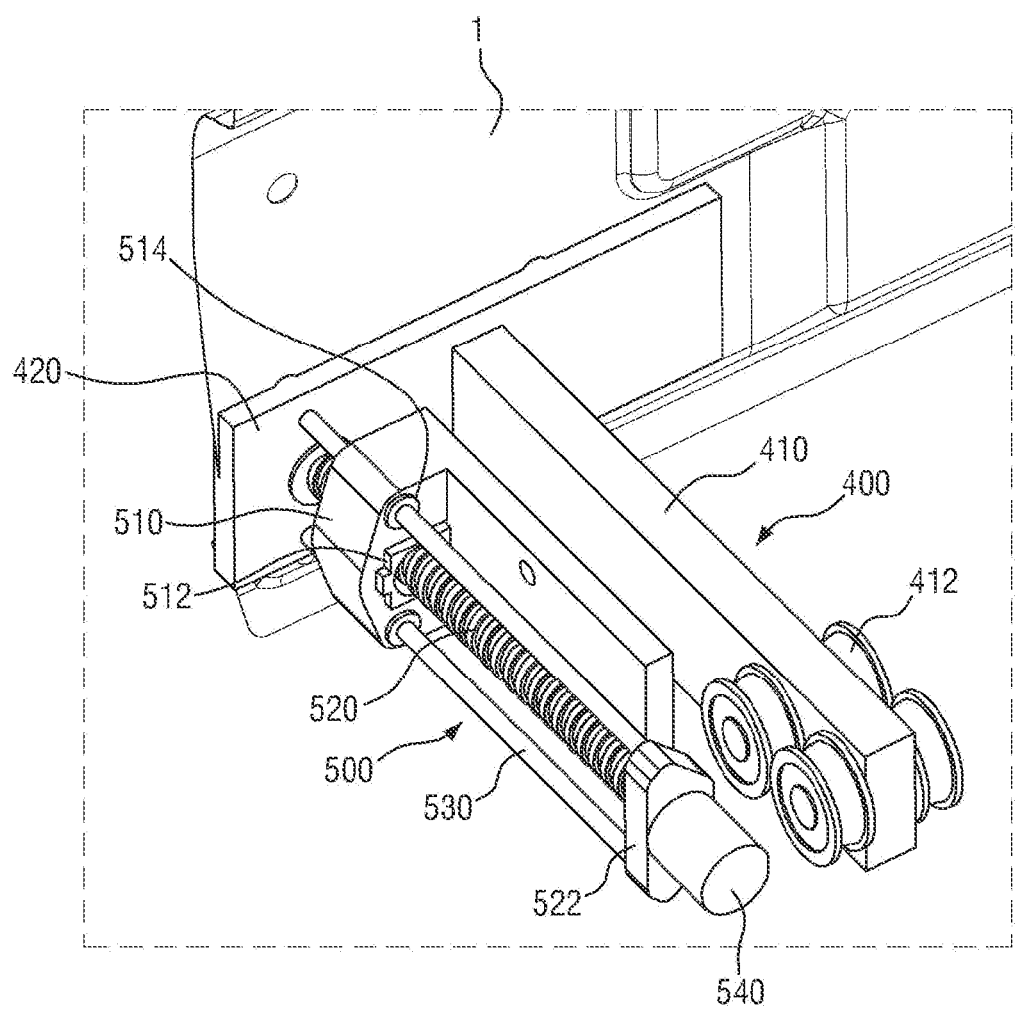
FIG. 8 is a view illustrating a state in which a spindle assembly and a movement support unit according to an exemplary embodiment of the present invention are connected to a door.

FIG. 8 is a view illustrating a state in which the spindle assembly and the movement support unit according to an exemplary embodiment of the present invention is connected to a door.

The movement support unit 400 includes the support member 410 and the second rollers 412. One end of the support member 410 may be fixedly mounted on the door 1 by means of a mounting bracket 420. The support member 410 may have a structure and may be made of a material having rigidity enough to support the door 1. The second rollers 412 are provided at the other side of the support member 410. According to an exemplary embodiment of the present invention, the second rollers 412 are provided at both sides of the support member 410, but there is no limitation to the position of the second roller 412 and the number of second rollers 412 provided on the support member 410.

As described above, the movement support unit 400 may be inserted into the internal space of the slider 300, which has a shape corresponding to the shape of the movement support unit 400, and the movement support unit 400 may roll. In this case, the second roller 412 functions as a bearing. When the movement support unit 400 mounted on the door 1 and the slider 300 mounted on the rail roller unit 200 are connected to each other, the door 1 and the vehicle body 2 face each other. In this case, the movement support unit 400 may move in the second direction with respect to the slider 300.

The spindle assembly 500 serves to move the door 1 in the second direction and includes a fixing unit 510, a spindle 520, and spindle guide units 530.

One surface of the fixing unit 510 is fixedly coupled to the slider 300. The fixing unit 510 has a spindle socket 512 so that the spindle 520 is inserted into the spindle socket 512. A thread corresponding portion (not illustrated) is formed on an inner circumferential surface of the spindle socket 512. In addition, the fixing unit 510 has guide sockets 514 so that the spindle guide units 530 are inserted into the guide sockets 514.

The spindle 520 is disposed in the longitudinal direction and connected and inserted into the spindle socket 512. A threaded portion is formed on an outer circumferential surface of the spindle 520. The threaded portion of the spindle 520 is thread-coupled to the thread corresponding portion formed on the inner circumferential surface of the spindle socket 512. Therefore, the spindle 520 may thread-move in the longitudinal direction with respect to the spindle socket 512 fixed to the fixing unit 510.

One end of the spindle 520 is fixed to the door 1 by means of the mounting bracket 420, and the other end of the spindle 520 is connected to a guide bracket 522. The spindle motor 540 is connected to the guide bracket 522. The spindle motor 540 is a motor that rotates in a forward or reverse direction and provides driving power to the spindle 520 so that the spindle 520 may move in the longitudinal direction (second direction).

Meanwhile, the spindle guide units 530 guide the movement of the spindle 520. The spindle guide units 530 are inserted into the guide sockets 514 and disposed in the longitudinal direction at both sides of the spindle 520. One end of the spindle guide unit 530 may be fixedly connected to the mounting bracket 420, and the other end of the spindle guide unit 530 is connected to the guide bracket 522. However, there is no limitation to the position and the number of spindle guide units 530.

Meanwhile, the structure according to an exemplary embodiment of the present invention further includes a position sensor (not illustrated) and a control unit (not illustrated) connected to the driving-sliding module 110 and the spindle motor 540.

The position sensor (not illustrated) measures a position of the door 1 on the lower rail 100 and transmits the measured position to the control unit. The completely closed position and the completely opened position of the door are set in advance on the lower rail 100.

The control unit receives a measured value from the position sensor, rotates the motor of the driving-sliding module 110 and the spindle motor 540, and controls the operations of opening, closing, and moving the door 1. For example, when the completely closed position is measured by the position sensor while the door 1 is opened, the control unit controls and stops the movement of the door 1.

The control unit may control and restrict the movement of the door 1 in any one of the first and second directions while the door 1 moves in the other of the first and second directions. For example, the control unit may restrict the rotation of the spindle motor 540 while the motor of the driving-sliding module 110 rotates.

Figure 9A:
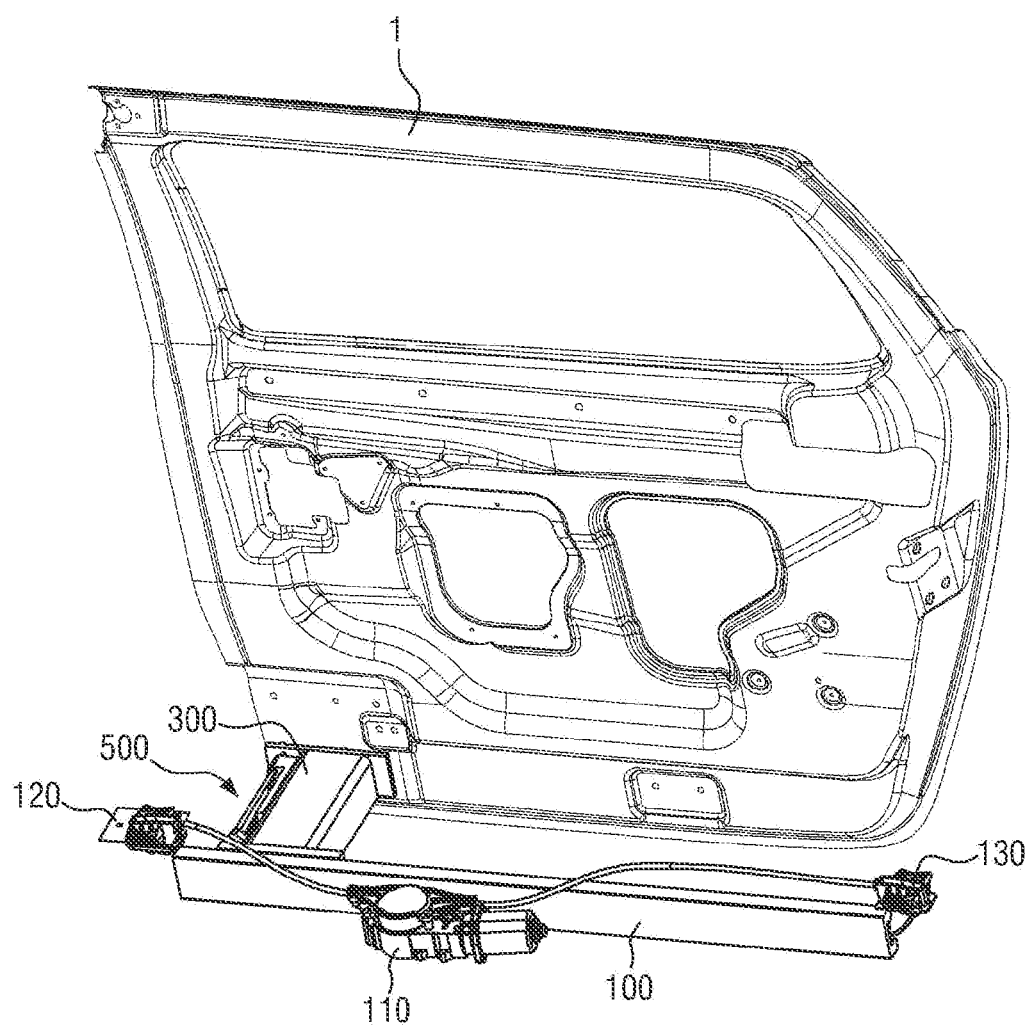
FIGS. 9A to 9C are views illustrating states in which the structure for preventing a sliding door from swaying according to an exemplary embodiment of the present invention operates while the door moves from a closed state to an opened state.
Figure 9B:
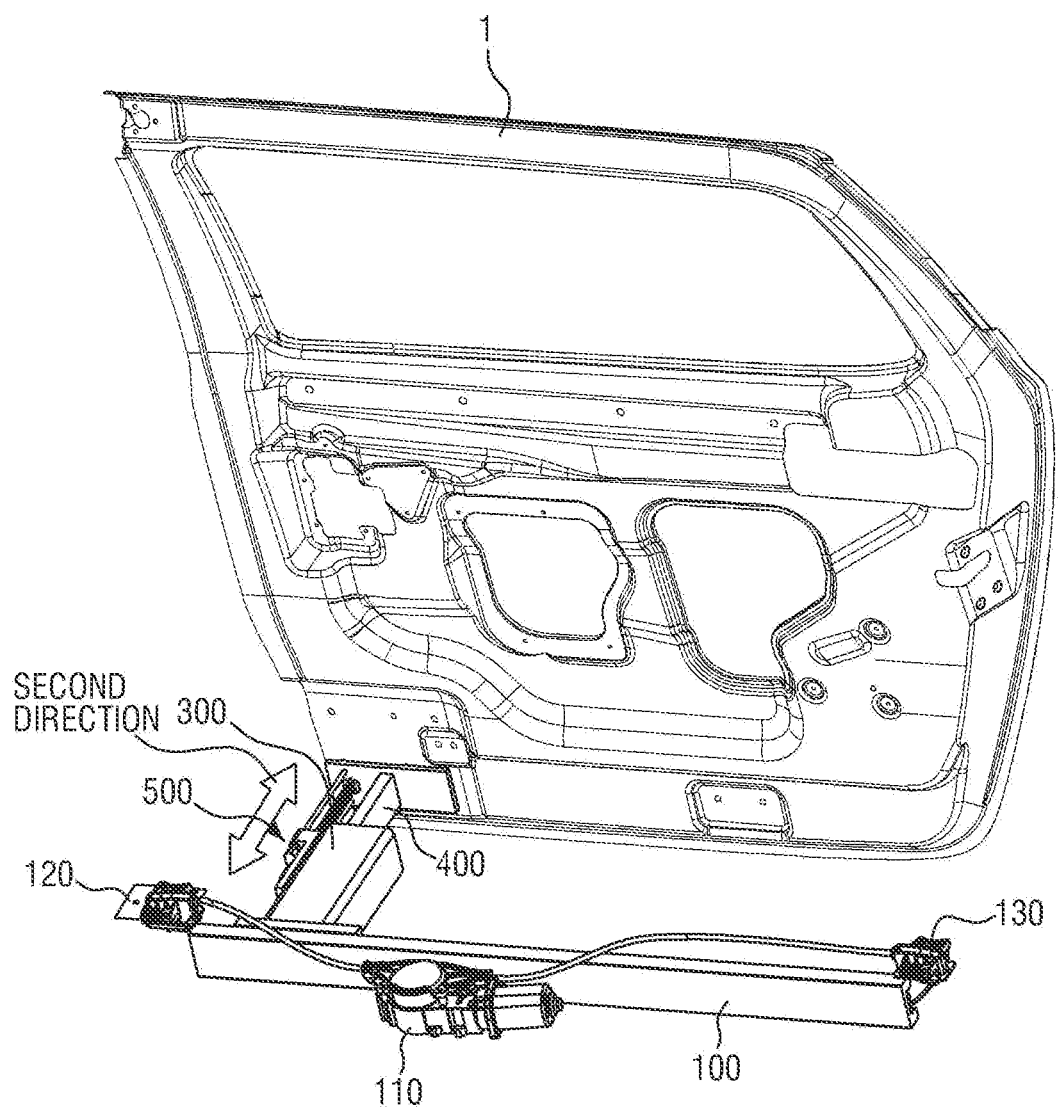
Figure 9C:
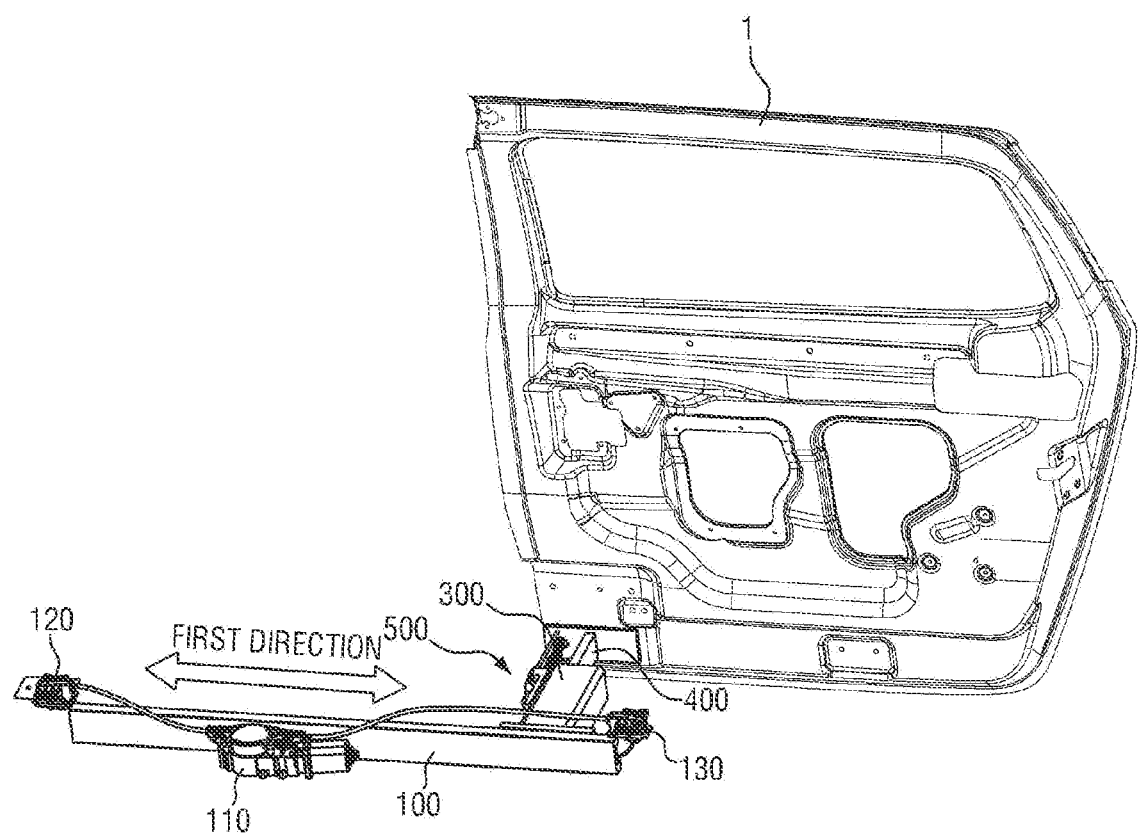

FIGS. 9A to 9C are views illustrating states in which the structure for preventing a sliding door from swaying according to an exemplary embodiment of the present invention operates while the door moves from a closed state to an opened state.

Hereinafter, a process of operating the structure for preventing a sliding door from swaying according to an exemplary embodiment of the present invention will be described with reference to FIGS. 9A to 9C.

FIG. 9A illustrates that the door 1 is in the closed state. The rail roller unit 200 is positioned at the completely closed position of the door 1 on the lower rail 100. The spindle 520 is completely rotated in one direction, and the movement support unit 400 is completely inserted into the slider 300.

FIG. 9B illustrates that the operation of opening the door 1 is performed in the state illustrated in FIG. 9A. In order to perform the operation of opening the door 1 in the completely closed state of the door 1, the door 1 needs to move to the position at which the door 1 and the vehicle body 2 do not interfere with each other. Therefore, the control unit controls and rotates the spindle motor 540 in the other direction. Then, the spindle 520 rotates in the other direction and moves in any one direction in the second direction (the direction in which the door 1 and the vehicle body 2 move away from each other). In this case, the support member 410 moves the door 1 in the same direction as the spindle 520 while moving along the internal space of the slider 300.

In this case, a distance, which the door 1 moves in the second direction, may be variously set as a distance that prevents interference between the door 1 and the vehicle body 2.

While the operation of opening the door 1 is performed, the movement support unit 400 serves to prevent the sway of the door 1 while supporting a load of the door 1. Specifically, in an exemplary embodiment of the present invention, a rotation shaft of the second roller 412 is formed in the first direction and connected to the support member 410, and the support member 410 moves in the second direction, such that the door 1 is prevented from swaying in the T direction. In addition, since the support member 410 withstands the load of the door 1 while the door 1 moves, the door 1 is prevented from swaying in an H direction (a width direction of the vehicle body 2). In addition, even while the door 1 moves in the second direction, the sway of the door 1 in an L direction is prevented by frictional force generated by a thread engagement of the spindle 520.

Meanwhile, there occurs a problem in that the door 1 sways if the door 1 moves in both the first direction and the second direction while the door 1 is opened. In order to prevent the problem, the control unit according to an exemplary embodiment of the present invention controls and prevents the rail roller unit 200 from moving in the first direction while the door 1 is opened.

When the operation of opening the door 1 is completed, the control unit rotates the motor of the driving-sliding module 110 in the other direction so that the door 1 moves in any one direction of the first direction (the direction in which the door 1 is opened). In this case, the control unit controls and stops the movement of the spindle 520 so that the door 1 does not move in the second direction any further.

Referring to FIG. 9C, the control unit controls and moves the door 1 in the first direction so that the door 1 moves to the completely opened position on the lower rail 100.

The movement support unit 400 and the rail roller unit 200 serve to prevent the sway of the door 1 while the door 1 moves. Specifically, in an exemplary embodiment of the present invention, a rotation shaft of the first roller 202 is formed in the second direction and connected to the rail roller unit 200, and the rail roller unit 200 moves in the first direction, such that the door 1 is prevented from swaying in the L direction. In addition, since the first roller 202 is inserted into the roller groove formed in an up-down direction in the lower rail 100, the door 1 is prevented from swaying in the H direction. In addition, since the support member 410 withstands the load of the door 1 while the door 1 moves, the door 1 is prevented from swaying in the H direction.

Meanwhile, FIGS. 9A to 9C illustrate the process of opening the door 1 in the completely closed state and then moving the door 1, and a process of moving the door 1 in the completely opened state and then closing the door 1 may be performed by reversely performing the above-mentioned process.

As described above, the structure for preventing a sliding door from swaying according to an exemplary embodiment of the present invention may prevent the sway of the door 1 while the door 1 is opened, closed, and moved even though the vehicle body 2 has only the lower rail 100.

The present invention has been described with reference to the limited exemplary embodiments and the drawings, but the present invention is not limited thereto. The described exemplary embodiments may be variously changed or modified by those skilled in the art to which the present invention pertains within the technical spirit of the present invention and within the scope equivalent to the appended claims.

What is claimed is:

1. A structure for preventing a sliding door from swaying, the structure comprising:
   a rail configured to be mounted in a first direction that is a longitudinal direction of a vehicle body;
   a rail roller unit connected to the rail so as to be able to move in a rolling manner along the rail;
   a sliding module configured to apply driving power in the first direction to the rail roller unit through a cable;
   a slider mounted on the rail roller unit;
   a movement support unit configured to support the sliding door, wherein a first side of the movement support unit is configured to be fixed to the sliding door, and a second side of the movement support unit is rollably connected to the slider; and
   a spindle assembly configured to operate a spindle between the sliding door and the rail to move the sliding door in a second direction perpendicular to the first direction,
   wherein the sliding module and the spindle assembly are configured to operate individually to prevent sway of the sliding door during an opening or a closing process of the sliding door according to a stage of the opening or the closing process, such that the sliding door moves in any one of the first and the second directions in a first stage of the opening or the closing process and then moves in the other of the first and the second directions in a second stage of the opening or the closing process.

2. The structure of claim 1, wherein the rail is configured to be provided at a lower side of the vehicle body and has a rectilinear shape.

3. The structure of claim 1, wherein the rail roller unit has cable holders to which the cable is connected.

4. The structure of claim 1, wherein the rail has pulleys configured to guide the cable to the rail roller unit.

5. The structure of claim 1, wherein the slider has an internal space into which the movement support unit is inserted.

6. The structure of claim 5, wherein the internal space includes a rolling path for the movement support unit.

7. The structure of claim 1, wherein the movement support unit comprises:
   a support member configured to be mounted on the sliding door in the second direction; and
   rollers configured to be rotatably connected to the support member.

8. The structure of claim 7, wherein the rollers are provided at both sides of the support member.

9. The structure of claim 1, wherein the sliding door is configured to move in the second direction in the first stage of the opening process and move in the first direction in the second stage of the opening process.

10. The structure of claim 1, wherein the sliding door is configured to move in the first direction in the first stage of the closing process and then move in the second direction in the second stage of the closing process.

11. A structure for preventing a sliding door from swaying, the structure comprising:
a rail configured to be mounted in a first direction which is a longitudinal direction of a vehicle body;
a rail roller unit connected to the rail so as to be able to move in a rolling manner along the rail;
a sliding module configured to apply driving power in the first direction to the rail roller unit through a cable;
a slider mounted on the rail roller unit;
a movement support unit configured to support the sliding door, wherein a first side of the movement support unit is configured to be fixed to the sliding door, and a second side of the movement support unit is configured to be rollably connected to the slider; and
a spindle assembly configured to operate a spindle between the sliding door and the rail to move the sliding door in a second direction perpendicular to the first direction, wherein the spindle assembly comprises:
a fixing unit fixed to the slider;
a spindle connected to the fixing unit so as to be thread-movable; and
a spindle motor configured to rotate the spindle in a forward or reverse direction,
wherein the sliding module and the spindle assembly are configured to operate individually to prevent sway of the sliding door during an opening or a closing process of the sliding door according to a stage of the opening or the closing process, such that the sliding door moves in any one of the first and the second directions in a first stage of the opening or the closing process and then moves in the other of the first and the second directions in a second stage of the opening or the closing process.

12. The structure of claim 11, wherein the spindle assembly further comprises a spindle guide unit provided in parallel with the spindle and configured to guide a thread-movement of the spindle.

13. The structure of claim 11, wherein the fixing unit has a spindle socket thread-coupled to the spindle.

14. A vehicle comprising:
a vehicle body;
a sliding door coupled to the vehicle body;
a rail mounted at a lower side of the vehicle body in a first direction, the first direction being a longitudinal direction of the vehicle body;
a rail roller unit connected to the rail so as to be able to move in a rolling manner along the rail;
a sliding module configured to apply driving power in the first direction to the rail roller unit through a cable;
a slider mounted on the rail roller unit;
a movement support unit configured to support the sliding door, wherein a first side of the movement support unit is configured to be fixed to the sliding door, and a second side of the movement support unit is configured to be rollably connected to the slider; and
a spindle assembly configured to operate a spindle between the sliding door and the rail to move the sliding door in a second direction perpendicular to the first direction,
wherein the sliding module and the spindle assembly are configured to operate individually to prevent sway of the sliding door during an opening or a closing process of the sliding door according to a stage of the opening or the closing process, such that the sliding door moves in any one of the first and the second directions in a first stage of the opening or the closing process and then moves in the other of the first and the second directions in a second stage of the opening or the closing process.

15. The vehicle of claim 14, wherein the rail has a rectilinear shape.

16. The vehicle of claim 14, wherein:
the rail roller unit has cable holders to which the cable is connected;
the rail has pulleys configured to guide the cable to the rail roller unit; and
the slider has an internal space into which the movement support unit is inserted, wherein the internal space includes a rolling path for the movement support unit.

17. The vehicle of claim 14, wherein the movement support unit comprises:
a support member mounted on the sliding door in the second direction; and
rollers provided at both sides of the support member and rotatably connected to the support member.

18. The vehicle of claim 14, wherein the spindle assembly comprises:
a fixing unit fixed to the slider, wherein the fixing unit has a spindle socket;
a spindle thread-coupled to the fixing unit;
a spindle motor configured to rotate the spindle in a forward or reverse direction; and
a spindle guide unit provided in parallel with the spindle and configured to guide a thread-movement of the spindle.

19. The vehicle of claim 14, wherein the sliding door is configured to move in the second direction in the first stage of the opening process and then move in the first direction in the second stage of the opening process.

20. The vehicle of claim 14, wherein the sliding door is configured to move in the first direction in the first stage of the closing process and then move in the second direction in the second stage of the closing process.

* * * * *